A. G. GEISTERT.
STEERING GEAR SUPPORTING BRACKET.
APPLICATION FILED FEB. 24, 1920.
1,368,427. Patented Feb. 15, 1921.
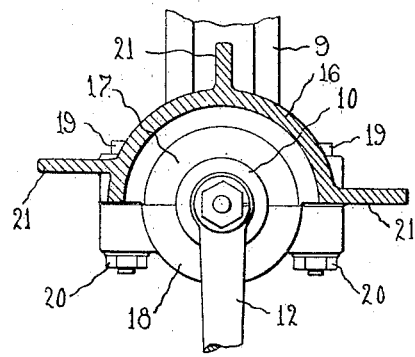
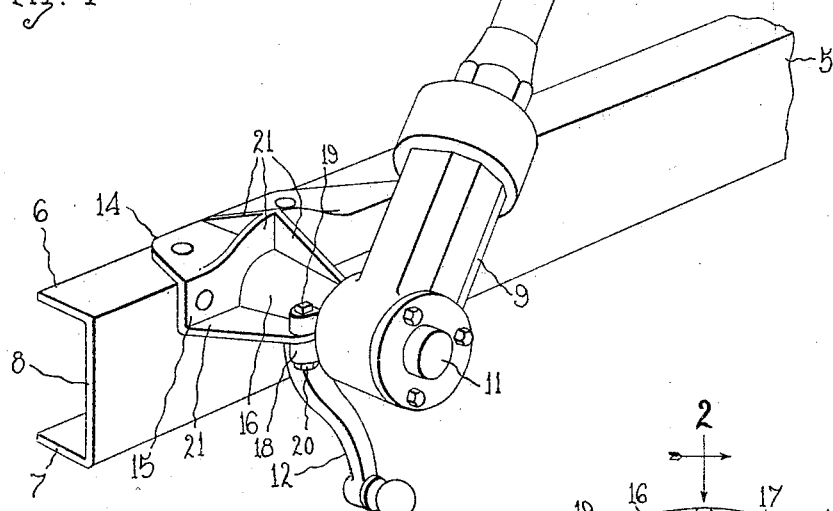
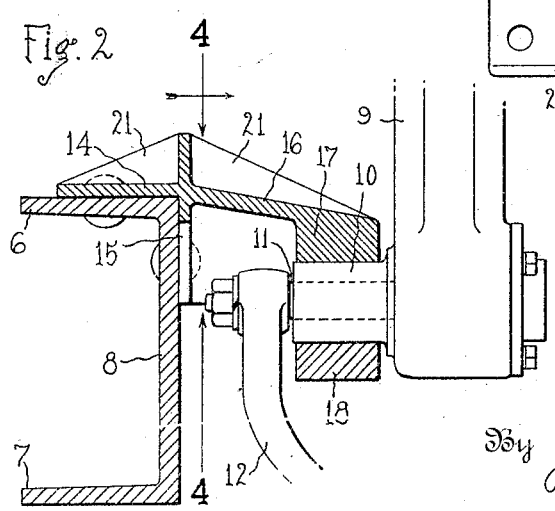
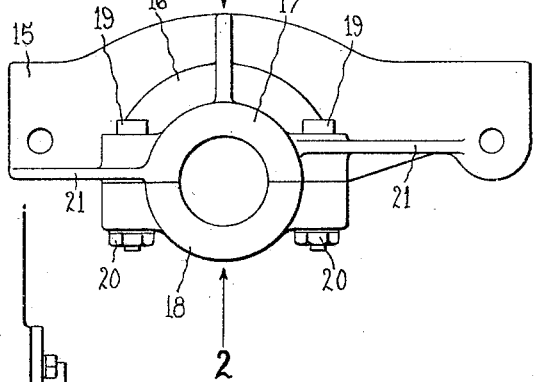
Inventor
Albert G. Geistert
By Attorneys
Blackmore, Spencer & Flint

UNITED STATES PATENT OFFICE.

ALBERT G. GEISTERT, OF NEW YORK, N. Y., ASSIGNOR TO GENERAL MOTORS CORPORATION, OF DETROIT, MICHIGAN, A CORPORATION OF DELAWARE.

STEERING-GEAR-SUPPORTING BRACKET.

1,368,427. Specification of Letters Patent. Patented Feb. 15, 1921.

Application filed February 24, 1920. Serial No. 360,787.

*To all whom it may concern:*

Be it known that I, ALBERT G. GEISTERT, a citizen of the United States, and a resident of New York, county of New York, and State of New York, have invented certain new and useful Improvements in Steering-Gear-Supporting Brackets, of which the following is a full, clear, concise, and exact description, such as will enable others skilled in the art to which the invention relates to make and use the same, reference being made therein to the accompanying drawings, which form a part of this specification.

My invention relates to steering mechanism or steering gears designed for use with automobiles, motor trucks, and similar self-propelled vehicles for the purpose of steering the same; and the object of my invention is to provide an improved supporting bracket whereby the mechanism through which the steering is accomplished is supported from one of the usual side frame members of the vehicle, said bracket being simple in construction and of such a form that an extremely strong support is provided for the steering mechanism when the same is assembled with the vehicle frame.

With the above and other objects of invention in view my invention consists in the improved steering gear supporting bracket illustrated in its preferred form in the drawing accompanying and forming a part of this specification; and in such variations and modifications thereof, within the scope of the concluding claims, as will be obvious to those skilled in the art to which my invention relates.

Referring now to the drawing,

Figure 1 is a perspective view showing the principal parts of a common form of steering mechanism supported from a side frame of the vehicle through and by means of my improved supporting bracket.

Fig. 2 is a view showing a section of my improved supporting bracket upon a vertically extending transverse plane indicated by line 2—2, Fig. 3.

Fig. 3 is a view showing my improved supporting bracket in side elevation.

Fig. 4 is a view showing a section upon a longitudinal plane indicated by the line 4—4, Fig. 2, looking toward the right.

Referring now to the drawing;

The reference numeral 5 designates one of the two oppositely disposed side frame members of the frame of a motor vehicle, said member being shown as having upper and lower substantially horizontal flanges 6, 7 connected by a vertically extending web 8 thereby providing a frame member of channel-like form in cross-section, as is usual in the side frame members of motor vehicles.

The reference numeral 9 designates the housing of an ordinary form of steering gear and which housing is provided with a laterally extending projection 10 shown as cylindrical in form and within which a bearing is provided for a substantially horizontally disposed oscillating steering arm shaft 11, to the free end of which a depending steering arm 12 is secured; and the lower end of which arm is connected with the steering knuckles at the wheels of the vehicle through suitable links not shown, but which are connected with the said steering arm through a suitable ball and socket joint at the lower end of said arm. Oscillatory motion is communicated to the shaft 11 and to the arm 12 to accomplish the steering of the vehicle through a suitable steering wheel and a steering shaft not shown, but which is located within the tubular steering post 13 extending upwardly from the housing 9, the steering shaft being operatively connected with the oscillating shaft 11 through any suitable mechanism located within the housing but which mechanism is not shown in detail as the same forms no part of the invention to which this present application relates.

The housing 9 is supported from the side frame member 5 by means of a bracket secured to said frame member and extending laterally therefrom, said bracket having horizontal and vertical walls 14, 15 overlying portions of the top flange 6 and of the web 8 and the same being secured to said frame member by rivets or equivalent fastening elements extending through registering holes in said walls and in said frame member. Extending laterally from the vertical wall 15 of the bracket is an arm 16 which is preferably curved in cross-section, as best shown in Fig. 4, and the inner free end of which is provided with a seat 17 disposed concentric with the arm. The under side of this seat has a surface so shaped as to correspond with the peripheral surface of the laterally extending projection 10 of the housing 9, and said curved seating surface is located below the level of the upper side of the side frame member, and at the free end of said arm, in the embodiment of my invention illustrated in the drawing.

The reference numeral 18 designates a cap member located beneath the seat 17 and shown as having a curved bearing surface adapted to engage the under side of the laterally extending projection 10, as best shown in Fig. 2 of the drawing; and which cap 18 is secured to the bracket, or rather to the free end thereof, by means of bolts 19 extending through registering passages provided in the bracket and in the cap; from which it will be appreciated that upon tightening the nuts 20 of the bolts the cap will be drawn into firm engagement with the projection 10 and said projection thus clamped between the cap and the seat upon the under side of the projecting portion of the bracket. The length of the projecting arm 16 is such that when the projection 10 is clamped in place as explained the oscillating steering arm 12 will be spaced apart from the frame member 5, as best shown in Fig. 2.

The bracket is provided with suitable strengthening ribs 21 formed integrally therewith, and all the elements of the bracket with the exception of the cap 18 and securing bolts 19 are formed as a single integral casting; thus providing an exceedingly strong structure and one in which maximum strength is secured for the amount of material entering into the construction thereof. Furthermore, the inner end of the oscillating steering arm 12 is supported beneath the curved arm 16 of the bracket, and partially within the same, thus providing a construction in which the steering arm is protected from injury both by the bracket and by the side frame member adjacent which it lies, and a construction in which the parts of the steering mechanism associated with the bracket are effectively protected from injury.

Having thus described and explained my invention, I claim and desire to secure by Letters Patent:

1. In a steering gear for motor vehicles and in combination with a side frame member channel shaped in cross-section, and a housing provided with a laterally extending projection cylindrical in form and having a bearing for an oscillating steering arm shaft; a bracket having horizontal and vertical walls adapted to be secured to the upper flange and to the web of said frame member, and a projecting arm curved in cross-section and having a seat concentric therewith at its free end, and which seat is spaced apart from said frame member and located upon the under side of said arm and shaped to conform with the projection aforesaid; a cap member having a curved surface adapted to engage said projection; and securing bolts extending through passages provided in said bracket and in said cap and whereby said projection may be clamped between said cap and the seat upon said bracket.

2. In a steering gear for motor vehicles and in combination with a side frame member channel shaped in cross-section, and a housing provided with a laterally extending projection having a bearing for an oscillating steering arm shaft; a bracket having horizontal and vertical walls adapted to be secured to the upper flange and to the web of said frame member, and a projecting arm curved in cross-section and having a seat at its free end shaped to conform with the projection aforesaid; a cap member adapted to engage said projection and having a curved portion shaped to conform therewith; and securing bolts extending through passages provided in said bearing and cap and whereby said projection may be clamped between said cap and the seat upon said bracket.

3. In a steering gear for motor vehicles and in combination with a side frame member channel shaped in cross-section, and a housing provided with a laterally extending projection having a bearing for an oscillating steering arm shaft; a bracket having horizontal and vertical walls adapted to be secured to the upper flange and to the web of said frame member, and a projecting arm having a seat upon its under side and spaced apart from the web of said frame member, and which seat is shaped to conform with the projection aforesaid; a cap member adapted to engage said projection; and securing bolts extending through passages provided in said bearing and cap and whereby said projection may be clamped between said cap and the seat upon said bracket.

4. In a steering gear for motor vehicles and in combination with a side frame member, and a housing provided with a laterally extending projection having a bearing for an oscillating steering arm shaft; a bracket secured to said frame member and extending laterally therefrom, and having a curved seat upon its under side and at its free end shaped to conform with the projection aforesaid; a cap member adapted to engage said projection; and securing bolts extending through passages provided in said bracket and in said cap and whereby said projection may be clamped between said cap and the seat upon said bracket.

5. In a steering gear for motor vehicles and in combination with a side frame member, and a housing provided with a laterally extending projection having a bearing for an oscillating steering arm shaft; a bracket secured to said frame member and having a projecting arm curved in cross-section and provided with a curved concentrically arranged seat at its free end shaped to conform with the projection aforesaid; a cap member adapted to engage said projection; and securing bolts extending through passages provided in said bracket and in said cap and whereby said projection may be clamped between said cap and the seat upon said bracket.

6. In a steering gear for motor vehicles and in combination with a side frame member, and a housing provided with a laterally extending projection having a bearing for an oscillating steering arm shaft; a bracket secured to said frame member and extending laterally therefrom; and means carried by said bracket and coöperating with said latterally extending projection to thereby support said housing from a point beneath the upper side of said frame member.

7. In a steering gear for motor vehicles and in combination with a side frame member, and a housing provided with a laterally extending projection having a bearing for an oscillating steering arm shaft; a bracket secured to said frame member and having a laterally extending arm; and means carried by said arm for engaging the laterally extending projection aforesaid of said housing, to thereby support said housing from said frame member.

8. In a steering gear for motor vehicles and in combination with a frame member, and a housing provided with a laterally extending projection having a bearing for an oscillating steering arm shaft; a bracket carried by said frame member and having a projecting arm curved in cross-section; and means carried by said bracket and located below the level of the upper side of said frame member, and to one side of said frame member, for engaging the laterally extending projection aforesaid of said housing to thereby support said housing from said frame member.

In testimony whereof I affix my signature.

ALBERT G. GEISTERT.